No. 827,575. PATENTED JULY 31, 1906.
W. H. SMEAD.
STAND.
APPLICATION FILED JUNE 9, 1905.
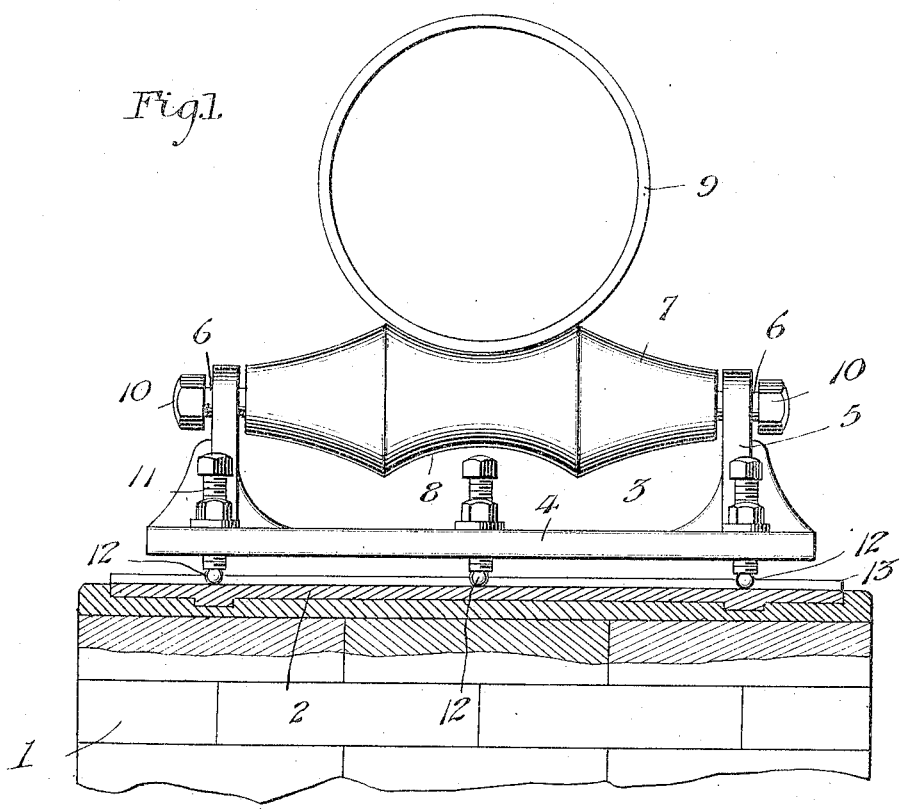
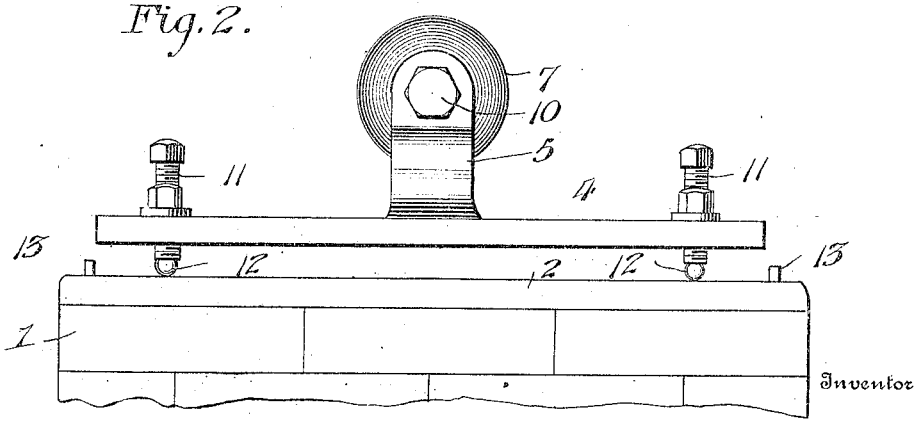
Witnesses
Phil E. Barnes
H. S. Elmore
Inventor
William H. Smead,
By Victor J. Evans
Attorney

UNITED STATES PATENT OFFICE.

WILLIAM H. SMEAD, OF CHARLOTTE, NORTH CAROLINA.

STAND.

No. 827,575.   Specification of Letters Patent.   Patented July 31, 1906.

Application filed June 9, 1905. Serial No. 264,425.

*To all whom it may concern:*

Be it known that I, WILLIAM H. SMEAD, a citizen of the United States, residing at Charlotte, in the county of Mecklenburg and State of North Carolina, have invented new and useful Improvements in Stands, of which the following is a specification.

This invention relates to stands designed especially for supporting pipes or steam-drums, and has for its objects to produce a comparatively simple inexpensive device of this character which may be readily adjusted vertically for alining the pipe or drum sections and one in which the stand will move automatically in any direction in a horizontal plane to readily accommodate itself to the expansion or contraction of the pipe.

A further object of the invention is to provide a device of this character, including bearing members or rollers, on which the pipe-sections are supported, one wherein said rollers move freely under longitudinal extension or contraction of the pipe-sections, one in which the rollers effectually sustain the sections against transverse displacement, and one wherein the vertical adjusting members or casters bear at their lower ends upon antifriction-balls on which the device as a whole travels in a horizontal plane.

With these and other objects in view the invention comprises the novel features of construction and combination of parts more fully hereinafter described.

In the accompanying drawings, Figure 1 is a front elevation of a device embodying my invention and showing a pipe or drum sustained thereby, and Fig. 2 is a side elevation of the device with the pipe omitted.

Referring to the drawings, 1 designates a base constructed, as usual, of stone or other masonry and having mounted upon its upper face a metal surface or base-plate 2, embedded in the support 1 or otherwise fixedly secured thereon.

Arranged for travel on the plate 2 is a carriage 3, comprising a horizontal body portion 4, having at its side edges and adjacent its longitudinal center uprising bearing members or ears 5, provided at their upper ends with suitable bearing-openings designed to receive the trunnions or journals 6, formed at the ends of a rotary bearing member or roller 7. The roller is provided at a central point between its ends with a peripheral groove or depression 8, constituting a seat for a pipe or drum 9, said seat being curved to conform to the cross-sectional curvature of the pipe, while the outer ends of the trunnions or journals 6 are provided with removable heads 10, adapted to prevent their accidental dislodgment from the bearing-openings.

The carriage is sustained by vertically-adjustable members 11, preferably in the form of bolts tapped through the base 4 and each provided at its lower end with a concavity to receive an antifriction member or ball 12, which in turn travels upon the base-plate 2, it being understood that there is a plurality, preferably six, of the sustaining members or bolts 11 and that each of said members seats upon one of the balls 12, while provided upon the base-plate are vertically-uprising ribs or flanges 13, constituting abutments to prevent the carriage accidentally traveling off of the support 1.

In practice the pipe or drum 10 is seated on the bearing-roller 7, which is freely rotatable on its trunnions 6, thus to permit endwise movement of the pipe, it being understood in this connection that in practice a plurality of the pipe or drum sections are joined together at their ends and that one or more of the devices herein disclosed is provided for supporting each of said sections. The pipe or drum sections having been properly arranged on the stands, the carriage may, through the medium of the adjustable sustaining members 11, be adjusted vertically to effect a vertical adjustment and alinement of the pipe-sections 9 relatively, thus to obviate sagging of one of the sections and the consequent creation of a leaky or defective joint, while the carriage will, owing to the provision of the balls 12 beneath the vertical members, travel freely in any direction in a horizontal plane to readily compensate for expansion or contraction of the pipe-sections. It is to be understood in this connection that by the provision of the antifriction-balls 12 on which the sustaining members rest, the carriage responds with such readiness to the expansive force of the pipe-sections as to adjust itself automatically.

It is the general practice to erect piers for the reception of the stands designed to carry heavy pipes or steam-drums, and owing to the latter being mounted prior to thorough settling of the piers the pipe or drum sections are after the piers have settled thrown out of alinement, which frequently results in the creation of defective or leaky joints at the points of connection of the sections, and owing to the pipe or drum supporting stands as heretofore constructed being unprovided with suitable adjusting means there has been no efficient provision for correcting the disalined pipe-sections. Aside from the settling of the piers the sections have been rendered liable to disconnection at the joints through expansion of the pipe metal, this expansion being obviously unequal in the pipe-sections relatively one to another, thereby causing the joints to open. Under my construction as above described these defects are wholly overcome and an efficient pipe-supporting stand provided, in the use of which the pipe-sections may be brought into and maintained in proper alinement.

Having thus described my invention, what I claim is—

1. In a device of the class described, a base-plate, a carriage arranged for travel thereover and provided with a rotary bearing member adapted to sustain a pipe-section, vertical sustaining members for the carriage, and antifriction devices between the base and ends of the sustaining members, said devices permitting free movement of the carriage in any direction in a horizontal plane over the base-plate.

2. In a device of the class described, a base-plate, a carriage arranged for travel thereover, a bearing-roller journaled on the carriage and adapted to sustain a pipe-section, vertically-adjustable sustaining members for the carriage, and antifriction devices disposed between the members and base and designed to permit free movement of the carriage in any direction in a horizontal plane over the base-plate.

3. In a device of the class described, a base-plate, a carriage arranged for travel thereover, vertically-adjustable sustaining members for the carriage, a bearing-roller journaled on the carriage and provided with a peripheral depression, said roller being adapted to sustain a pipe-section, and antifriction devices disposed between the sustaining members and base-plate and designed to permit free movement of the carriage in any direction in a horizontal plane over the base-plate.

4. In a device of the class described, a base-plate, a carriage arranged for travel thereover and having uprising bearing members, a bearing-roller terminally journaled in said members and provided between its ends with a peripheral depression, said roller being adapted to sustain a pipe-section, vertically-adjustable sustaining members carried by the carriage, and antifriction-balls disposed between the lower ends of the said sustaining members and the base to facilitate movement of the carriage in any direction in a horizontal plane over the base-plate.

In testimony whereof I affix my signature in presence of two witnesses.

WILLIAM H. SMEAD.

Witnesses:
L. E. WIGHTMAN,
W. M. BOGART.